US010218508B2

(12) United States Patent
Zimmer et al.

(10) Patent No.: US 10,218,508 B2
(45) Date of Patent: *Feb. 26, 2019

(54) METHODS AND APPARATUS TO PROVIDE ISOLATED EXECUTION ENVIRONMENTS (71) Applicant: Intel Corporation, Santa Clara, CA (US)

(72) Inventors: Vincent J. Zimmer, Federal Way, WA (US); Rajesh Poornachandran, Portland, OR (US); Mingqiu Sun, Beaverton, OR (US); Gopinatth Selvaraje, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/917,360

(22) Filed: Mar. 9, 2018

(65) Prior Publication Data
US 2018/0198622 A1 Jul. 12, 2018

Related U.S. Application Data
(63) Continuation of application No. 14/864,085, filed on Sep. 24, 2015.

(51) Int. Cl.
G06F 21/53 (2013.01)
G06F 9/22 (2006.01)
(Continued)

(52) U.S. Cl.
CPC ............ *H04L 9/3234* (2013.01); *G06F 9/226* (2013.01); *G06F 9/30043* (2013.01);
(Continued)

(58) Field of Classification Search
CPC ............ H04L 9/226; H04L 9/22; G06F 21/53
(Continued)

(56) References Cited

U.S. PATENT DOCUMENTS 5,511,195 A 4/1996 Kennedy, Jr. et al.
6,081,888 A 6/2000 Bell et al.
(Continued)

OTHER PUBLICATIONS

International Searching Authority, "International Search Report and Written Opinion," issued in connection with International Patent Application No. PCT/US2016-048171, dated Jan. 3, 2017, 13 pages.

(Continued)

*Primary Examiner* — Jason K Gee
*Assistant Examiner* — Dereena T Cattungal
(74) *Attorney, Agent, or Firm* — Hanley Flight & Zimmerman, LLC (57) ABSTRACT Methods and apparatus to provide isolated execution environments are disclosed. An example apparatus includes a machine status register to determine whether excess micro operations are available during an instruction cycle to execute a pico-application in response to a request for computing provided by a host application. The pico-application is a fragment of microcode. The microcode comprises a plurality of micro operations. The machine status register is also to determine whether space is available in a memory to load the pico-application. The example apparatus also includes a loader to load a virtual machine and the pico-application into the memory in response to the excess micro operations and the space in the memory being available. The virtual machine validates the pico-application and loads the pico-application into the memory. The example apparatus also includes a processor to execute the pico-application via the excess micro operations.

20 Claims, 8 Drawing Sheets (51) Int. Cl.

| | | |
|---|---|---|
| *G06F 21/57* | (2013.01) | |
| *H04L 9/32* | (2006.01) | |
| *G06F 9/30* | (2018.01) | |
| *G06F 9/38* | (2018.01) | |
| *G06F 21/60* | (2013.01) | |
| *G06F 9/455* | (2018.01) | |

(52) U.S. Cl.
CPC ........ *G06F 9/3877* (2013.01); *G06F 9/45558* (2013.01); *G06F 21/53* (2013.01); *G06F 21/577* (2013.01); *G06F 21/602* (2013.01); *G06F 2009/45587* (2013.01); *G06F 2221/034* (2013.01); *G06F 2221/2149* (2013.01)

(58) Field of Classification Search
USPC .......................................................... 726/25
See application file for complete search history.

(56) References Cited

U.S. PATENT DOCUMENTS

| | | | |
|---|---|---|---|
| 7,216,220 B2 | 5/2007 | Brown et al. | |
| 7,640,418 B2 | 12/2009 | Lee et al. | |
| 9,122,465 B2* | 9/2015 | Schardt | G06F 9/3851 |
| 9,244,705 B1* | 1/2016 | Bondalapati | G06F 9/45504 |
| 9,275,248 B1 | 3/2016 | Potlapally et al. | |
| 2002/0109682 A1* | 8/2002 | Nash | G06F 9/3879 |
| | | | 345/418 |
| 2005/0081212 A1 | 4/2005 | Goud et al. | |
| 2005/0091365 A1 | 4/2005 | Lowell et al. | |
| 2006/0005188 A1 | 1/2006 | Vega et al. | |
| 2006/0161740 A1* | 7/2006 | Kottapalli | G06F 9/528 |
| | | | 711/152 |
| 2007/0088939 A1* | 4/2007 | Baumberger | G06F 9/24 |
| | | | 712/248 |
| 2007/0136570 A1 | 6/2007 | Frank et al. | |
| 2008/0163186 A1 | 7/2008 | Devarajan et al. | |
| 2008/0256336 A1 | 10/2008 | Henry et al. | |
| 2009/0089860 A1 | 4/2009 | Forrester et al. | |
| 2009/0210638 A1 | 8/2009 | Mayer | |
| 2009/0292903 A1 | 11/2009 | Henry et al. | |
| 2009/0319804 A1 | 12/2009 | Qi et al. | |
| 2010/0049962 A1* | 2/2010 | Chen | G06F 9/24 |
| | | | 713/2 |
| 2014/0181984 A1 | 6/2014 | Kundu et al. | |
| 2017/0093578 A1 | 3/2017 | Zimmer et al. | |

OTHER PUBLICATIONS

Ruan, "Platform Embedded Security Technology Revealed: Safeguarding the Future of Computing with Intel Embedded Security and Management Engine," Apress Open, 2014 (263 pages).

The United States Patent and Trademark Office, Non-final Office Action issued in connection with U.S. Appl. No. 14/864,085, dated May 8, 2017, 38 pages.

The United States Patent and Trademark Office, Final Office Action issued in connection with U.S. Appl. No. 14/864,085, dated Oct. 6, 2017, 35 pages.

The United States Patent and Trademark Office, Notice of Allowance issued in connection with U.S. Appl. No. 14/864,085, dated Dec. 20, 2017, 22 pages.

The United States Patent and Trademark Office, Supplemental Notice of Allowability issued in connection with U.S. Appl. No. 14/864,085, dated Jan. 9, 2018, 4 pages.

International Searching Authority, "International Preliminary Report on Patentability" issued in connection ith International Patent Application No. PCT/US2016/048171, dated Apr. 5, 2018, 10 pages.

* cited by examiner

METHODS AND APPARATUS TO PROVIDE ISOLATED EXECUTION ENVIRONMENTS

CROSS REFERENCE TO RELATED APPLICATIONS

This patent arises from a continuation of U.S. patent application Ser. No. 14/864,085, filed Sep. 24, 2015, entitled "METHODS AND APPARATUS TO PROVIDE ISOLATED EXECUTION ENVIRONMENTS," now U.S. Pat. No. 9,998,284, which is hereby incorporated herein by reference in its entirety.

FIELD OF THE DISCLOSURE

This disclosure relates generally to computer architecture and, more particularly, to methods and apparatus to provide isolated execution environments.

BACKGROUND

In recent years, mobile devices have become increasingly smaller. While modern technology has allowed smaller devices to maintain performance comparable to larger device counterparts, certain computational aspects may have to be given up in order to decrease the size of a device. For example, a trusted platform module is generally a dedicated second processor that, if used, prevents the size decreasing of the device. In some examples, platform trust technology is integrated into a co-processor. However, second processors and/or co-processors impose additional cost and size restrictions to devices utilizing them and, therefore, are often eliminated from smaller devices.

DETAILED DESCRIPTION

The example methods and apparatus disclosed herein are used to provide isolated execution environments previously impossible due to a lack of hardware or a dedicated co-processor. In some examples, the example methods and apparatus provide isolated execution environments for small Internet of Things devices where dedicated hardware or co-processors are impractical to use due to size restraints or to increasing costs associated with such devices.

The Internet of Things ("IoT") is the network of physical objects embedded with computing components that enable the exchange of data. Wearable technology, or wearables, are clothing or accessories incorporating electronic technology and are one example of IoT objects. As more and more objects are incorporated with technology and networked together, the phrase the Internet of Everything ("IoE") becomes a more accurate term for such technology. In some examples, to avoid adding excess bulk to existing devices and to make added technology less noticeable, the added embedded computing components are often significantly small in size.

Networking technological devices together involves the computing and transfer of data. However, data transfers and mobile computing amongst a plurality of known and/or unknown devices and/or networks lends itself to security vulnerabilities. Numerous secure crypto-processors have been developed to increase security. For example, a trusted platform module ("TPM") is a dedicated security processor or co-processor that is generally isolated from the host central processing unit ("CPU"), firmware, and operating system. A TPM may provide, for example, random number generation, encryption/decryption key generation, hash generation, and/or signature generation. As used herein, the term "trusted platform" is defined as a platform that behaves in a manner that is expected for its designated purposes. In some examples, a processor, co-processor, controller, or other control unit may embed a firmware-based TPM isolated from the host. However, these example crypto-processors require dedicated separate distinct hardware subsystems that are often incapable of being provided in smaller devices.

For example, integrating a TPM in a computing system may involve integrating an additional processor onto a separate chip or into the chip containing the CPU. However, such integration increases the size and cost of the system. In some examples, such as in wearable technology, integration of a TPM or other security solution can double the size and the cost of a device. Even further, TPMs are generally not optimized for energy efficiency and can impact the power budget for low-power systems. For IoT/IoE devices, such as, for example, wearables, a secondary dedicated TPM is impractical due to cost and size factors.

Figure 1:
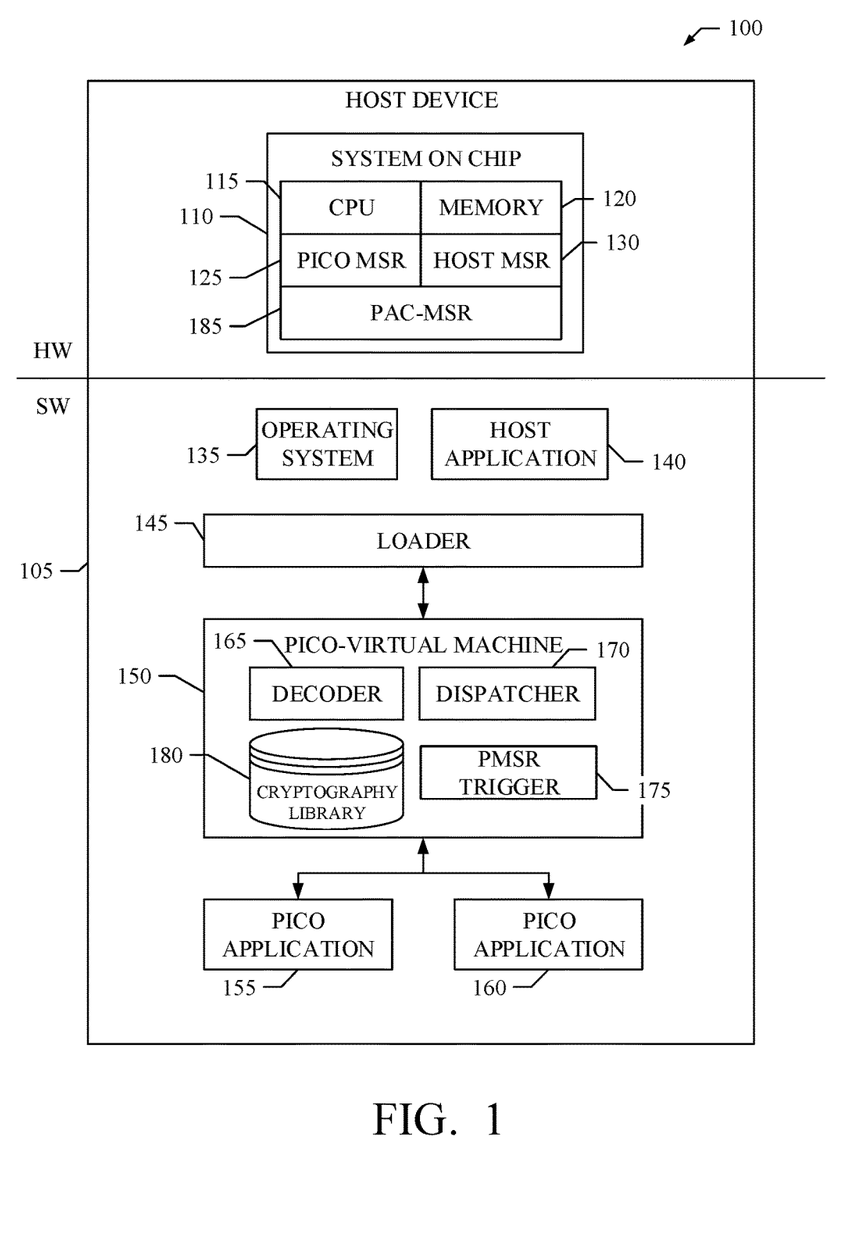
FIG. 1 is a block diagram of an example apparatus to provide isolated execution environments.

In some examples, IoT/IoE devices have very a small chip, or die, with a general CPU or a specialized processor disposed thereon. Accordingly, a distinct trusted subsystem cannot be added to the die to implement a trusted isolated execution environment. FIG. 1 is a block diagram of an example apparatus 100 to provide isolated execution environments in such circumstances. The example apparatus 100 includes a host device 105 with a system on chip ("SoC") 110. In some examples, the SoC 110 includes a CPU 115, memory 120 (e.g., cache memory or SRAM), a pico-model-specific register ("pico-MSR") 125, and a host MSR 130 as hardware components. Additionally, the host device 105 may be programmed with software to be performed by the CPU 115 and stored in the memory 120. In the illustrated example, the software includes an operating system 135, one or more host applications 140, a loader 145, a pico-virtual machine ("pVM") 150, and one or more pico-applications ("pApps") 155, 160. In some examples, the pVM 150 includes a decoder 165, a dispatcher 170, and a pico-model-specific register trigger ("pMSR trigger") 175. In some examples, the pVM 150 also includes a cryptography library 180. Accordingly, the example apparatus 100 does not require the addition of significant hardware that would increase the cost and size of the example SoC 110.

In some examples, the host device 105 is an IoT/IoE device such as, for example, a wearable (e.g., an Apple® watch, Google™ Glass, Microsoft® HoloLens, etc.). In such examples, the SoC 110 is limited in size to fit within such devices. In some examples, it is impractical to attach a separate TPM or CSME to the host device 105 because a dedicated TPM or CSME would drastically increase the size of the SoC 110, thereby drastically increasing the size of the host device 105.

In some examples, the CPU 115 includes an x86 instruction set architecture ("ISA"). An ISA defines how a processor acts based on its programming and includes a set of operation codes, or opcodes, to specify what operations the device is to perform. An instruction includes an opcode along with operands, or the data in which the operation is to perform on. An instruction is generally received during an instruction cycle.

In some examples, the instruction cycle is separated down into fetch, decode, and execute. First, an instruction is fetched from memory 120. Next, the CPU 115 decodes the instruction so the CPU 115 may process the same. Lastly, the CPU 115 executes the instruction based on the interpretation. In some examples, the CPU 115 decodes an instruction into smaller segments called micro operations (i.e., "micro-ops" or "μOPs").

In some examples, micro operations are detailed low-level instructions used to implement complex machine instructions (i.e., macro-instructions). For example, micro operations perform operations on data stored in one or more registers, transfer data between registers or between registers and external buses of the CPU 115, and perform arithmetic or logical operations on and/or between registers. In the typical fetch-decode-execute cycle, a macro-instruction is decomposed into a series of corresponding micro operations during its execution.

To address a lack of a hardware isolated execution environment that can be used for manageability, security, and/or other valuable use cases, the example pVM 150 provides trusted computing for the example host application 140 via the example pApps 155, 160. For example, the pVM 150 is a virtual machine separate from the operating system 135 for emulating small fragments of code or pApps 155, 160. In some examples, the isolation of the pVM 150 from the operating system 135 allows the pVM 150 to operate while the operating system 135 is booting.

The example pVM 150 allows the pApps 155, 160 to be loaded into the memory 120 of the host device 105. In some examples, both the pVM 150 and the pApps 155, 160 are decoded into micro operations by the decoder 165. In some examples, the host application 140 (e.g., an MMS application on a wearable) performs a write to the pico-MSR 125 to indicate an isolated execution is requested. In some examples the host application 140 is the operating system 135. In response to being written, the example pMSR trigger 175 interacts with the example loader 145 to take control from the example host application 140. In some examples, the pMSR trigger 175 indicates to the decoder 165 using pApp identifiers, which pApps 155, 160 are to be loaded by. The example decoder 165 checks the example cryptography library 180 for example pApps 155, 160 matching the example pApp identifiers generated by the pMSR trigger 175 prior to decoding the pApps 155, 160. Thereafter, the example pMSR trigger 175 indicates to the example dispatcher 170 to send the decoded example pApps 155, 160 to the example loader 145. In some examples, the loader 145 loads the pVM 150 and the pApps 155, 160 into memory 120 for execution of the same.

The aforementioned process is reversed when the example pApps 155, 160 write to the example host MSR 130. For example, when the pApps 155, 160 finish execution, the pApps 155, 160 write to the host MSR 130. In response to being written, the example pMSR trigger 175 interacts with the example loader 145 to unload the example pVM 150 and the example pApps 155, 160 from example memory 120 and return control back to the example host application 140.

As mentioned above, the example host application 140 writes to the example pico-MSR 125 to indicate an isolated execution. In some examples, the isolated executions may be security critical trusted computing operations. For example, digital rights management ("DRM") requires such security operations to restrict the unauthorized use of proprietary media (e.g., copyright infringement). In such examples, a media may have access restricted through the use of the isolated executed fragments of code, or pApps 155, 160.

In some examples, the pApps 155, 160, are triggered on-demand (i.e., on an as-needed basis), by the host application 140. Additionally or alternatively, the isolated execution may be triggered based on certain pre-determined events. Such events include thermal events (e.g., overheating), resets, overclocking, tampering, system state transition, etc. Accordingly, the example loader 145 can load pApps 155, 160 responsive to micro architectural event triggers to record and/or correct the same.

The example loader 145 is a microcode program that handles message signal interrupts generated by the example host application 140 write to the example pico-MSR 125 and the example pApps 155, 160 write to the example host MSR 130. In some examples, the loader 145 verifies the authenticity of the pVM 150 and the pApps 155, 160 prior to loading. In some examples, the authenticity of the pVM 150 and the pApps 155, 160 is verified by checking whether the pVM 150 and the pApps 155, 160 match the platform of the CPU 115, have valid headers, loader versions, and check sums, and/or pass an authenticity and/or signature pass.

In some examples, the pVM 150 and the pApps 155, 160 are microcode distributed in ASCII encoded, cryptographically signed binary files. In some examples, the pApps 155, 160 are small fragments of code to perform isolated operations such as, for example, scrub, seal, decode, wrap key, unwrap key, derive key, generate key, bind key, sign, record state, or audit. In such examples, the pApps 155, 160 utilize surplus micro-operations available in ISA.

As disclosed herein, the example apparatus 100 creates isolated execution environments. In some examples, the example apparatus 100 introduces pApps 155, 160 coded in microcode to utilize surplus (e.g., excess) micro operations available in the ISA (e.g., x86 ISA). In some examples, excess micro operations occur when instructions are variable in size. For example, an excess of 16 bits may form between a 16 bit instruction and a 32 bit instruction, allowing a plurality of micro operations to occur therebetween. Excess micro operations may also occur when micro operations are capable of being executed in parallel with other micro operations. For example, two micro operations may be able to be executed in the same cycle so long as the proper sequence of events occurs and/or conflicts are avoided (e.g., MEMORY→MDR cannot occur at the same time as MDR→IR). Additionally and/or alternatively, excess micro operations may occur when the CPU is idling and/or when an instruction has high latency (e.g., latency due to off-chip retrieval). In some examples, decoded micro operations are cached, so a processor can directly access the decoded micro operations from the cache, instead of decoding them again. Accordingly, excess micro operations may be cached when cache memory is available.

In some examples, the memory 120 may vary by device based on the SoC 110, CPU 115, ISA, and/or time at which a pApp 155, 160 is to be loaded. In such examples, the host device 105 further includes an indicia as to the capability and compatibility of pApps 155, 160 and ISA extensions with the memory 120. In the illustrated examples, the host device 105 includes a pico-application capability MSR ("PAC-MSR") 185 to determine whether and/or when a pApp 155, 160 is loadable into memory 120. The example PAC-MSR 185 determines the size of the pApps 155, 160 to be loaded into memory 120. In some examples, the PAC-MSR 185 determines the available space in the memory 120, whether excess micro operations exist for use by the pApps 155, 160, and whether the pApps 155, 160 are capable of being loaded into memory 120 at any given time. The example PAC-MSR 185 signals the example loader 145 when the example pApps 155, 160 are capable of being loaded into example memory 120 based on memory space and available micro operations.

Figure 2:
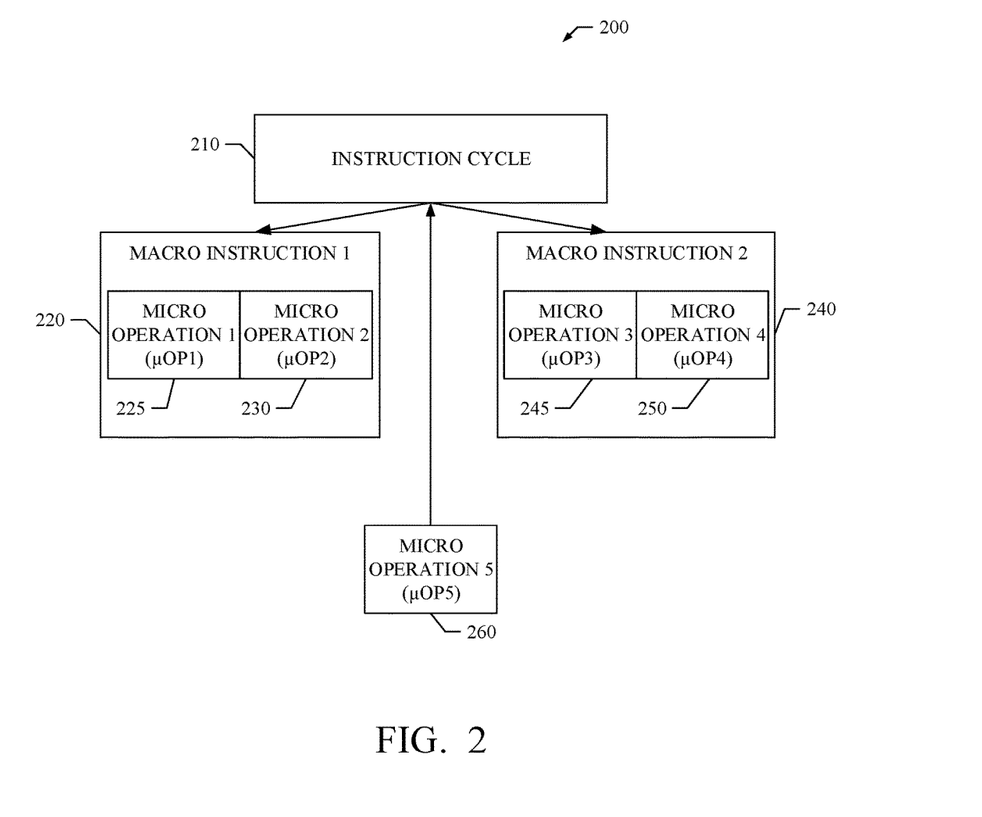
FIGS. 2-3 illustrate example introductions of small fragments of code in the form of micro operations during instruction cycles of the example apparatus of FIG. 1.

FIGS. 2-3 illustrate example introductions of small fragments of code in the form of micro operations during instruction cycles of a CPU by the example apparatus of FIG. 1. An example illustration 200 shown in FIG. 2 depicts an instruction cycle 210 including a first macro instruction 220 and a second macro instruction 240. As previously discussed, macro instructions may be separated into micro operations or µOps. For example, the first macro instruction 220 is separated into µOP1 225 and µOP2 230. Similarly, the second macro instruction 240 may be separated into µOP3 245 and µOP4 250. In some examples, the apparatus 100 reuses the micro architecture state machine between macro instructions to execute a µOP5 260. For example, pApp 155 may be executed with µOP5 260 between the first macro instruction 220 and the second macro instruction 240. Thus, an isolated fragment of code (i.e., µOP5 260) may be executed using micro operations inter-spliced between macro instructions.

Figure 3:
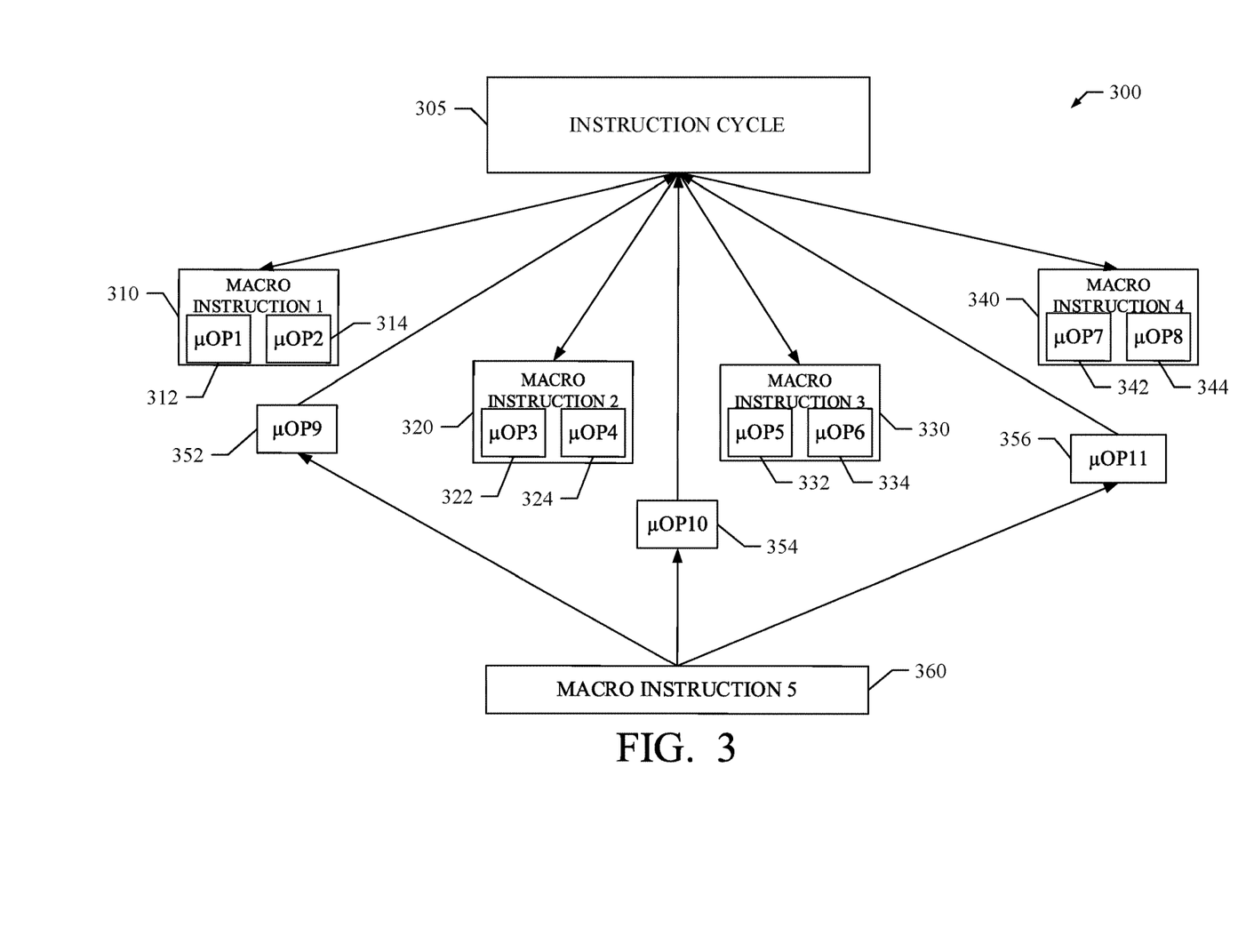

An example illustration 300 depicts alternate example introductions of small fragments of code in the form of micro operations during instruction cycles of a CPU by the example apparatus 100 of FIG. 1. Similar to FIG. 2, FIG. 3 illustrates an example instruction cycle 305 including an example first macro instruction 310, an example second macro instruction 320, an example third macro instruction 330, and an example fourth macro instruction 340. In some examples, the first macro instruction 310 is separated into µOP1 312 and µOP2 314. In some examples, the second macro instruction 320 is separated into µOP3 322 and µOP2 324. In some examples, the third macro instruction 330 is separated into µOP5 332 and µOP6 334. In some examples, the fourth macro instruction 340 is separated into µOP7 342 and µOP8 344.

In some examples, µOP9 352 is executed in parallel with µOP2 314. In some examples, µOP10 354 is executed between the second macro instruction 320 and the third macro instruction 330. In some examples, µOP11 356 is executed during latency caused by the fourth macro instruction 340. In the illustrated example, isolated fragments of code (i.e., µOP9 352, µOP10 354, and µOP11 356) are inter-spliced during the instruction cycle 305. Even further, while example µOP9 352, µOP10 354, and µOP11 356 are isolated fragments of code, together example µOP9 352, µOP10 354, and µOP11 356 may form an example fifth macro instruction 360.

While an example manner of implementing the apparatus 100 is illustrated in FIG. 1, one or more of the elements, processes and/or devices illustrated in FIG. 1 may be combined, divided, re-arranged, omitted, eliminated and/or implemented in any other way. Further, the example host device 105, the example SoC 110, the example CPU 115, the example memory 120, the example pico-MSR 125, the example host MSR 130, the example operating system 135, the example host applications 140, the example loader 145, the example pVM 150, the example pApps 155, 160, the example decoder 165, the example dispatcher 170, the example pMSR trigger 175, the example cryptography library 180, the example PAC-MSR 185, and/or, more generally, the example apparatus 100 of FIG. 1 may be implemented by hardware, software, firmware and/or any combination of hardware, software and/or firmware. Thus, for example, any of the example host device 105, the example SoC 110, the example CPU 115, the example memory 120, the example pico-MSR 125, the example host MSR 130, the example operating system 135, the example host applications 140, the example loader 145, the example pVM 150, the example pApps 155, 160, the example decoder 165, the example dispatcher 170, the example pMSR trigger 175, the example cryptography library 180, the example PAC-MSR 185, and/or, more generally, the example apparatus 100 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example host device 105, the example SoC 110, the example CPU 115, the example memory 120, the example pico-MSR 125, the example host MSR 130, the example operating system 135, the example host applications 140, the example loader 145, the example pVM 150, the example pApps 155, 160, the example decoder 165, the example dispatcher 170, the example pMSR trigger 175, the example cryptography library 180, the example PAC-MSR 185, and/or, more generally, the example apparatus 100 of FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example apparatus 100 of FIG. 1 may include one or more elements, processes and/or devices in addition to, or instead of, those illustrated in FIG. 1, and/or may include more than one of any or all of the illustrated elements, processes and devices.

Flowcharts representative of example machine readable instructions for implementing the apparatus 100 of FIG. 1 is shown in FIGS. 4-7. In this example, the machine readable instructions comprise a program for execution by a processor such as the processor 812 shown in the example processor platform 800 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIGS. 4-7, many other methods of implementing the example apparatus 100 may alternatively be used. For example, the order of execution of the blocks may be changed, and/or some of the blocks described may be changed, eliminated, or combined.

As mentioned above, the example processes of FIGS. 4-7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 4-7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

Figure 4:
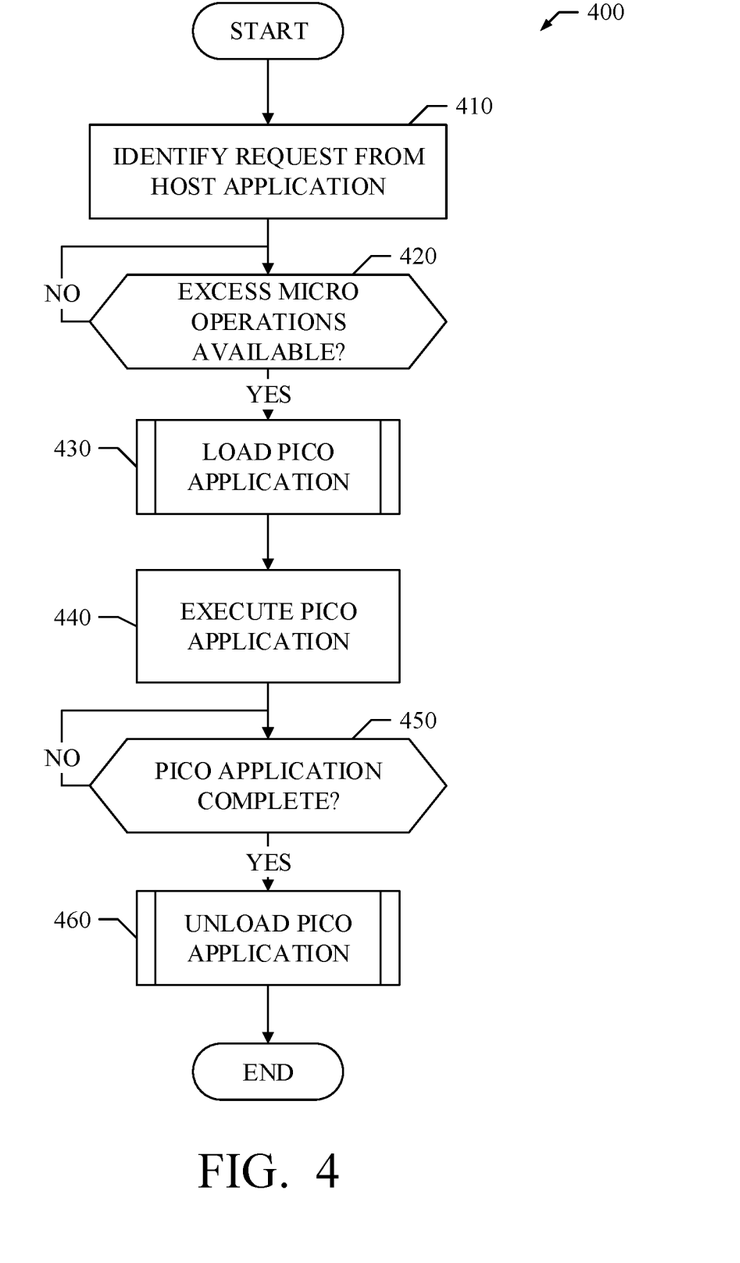
FIG. 4 illustrates example machine readable instructions for implementing the example apparatus of FIG. 1.

FIG. 4 illustrates example machine readable instructions for implementing the example apparatus of FIG. 1. An example program 400 begins at block 410. At block 410, the example host application 140 requests a trusted isolated execution. The example pMSR trigger 175 identifies this request and generates a pico-message signaled interrupt ("pMSI"). In some examples, the pMSI signals the loader 145 to verify whether excess micro operations are available (block 420). In some examples, the PAC-MSR 185 determines whether a pApp 155, 160 is loadable based on, at least, size of the pApp 155, 160, available space in memory 120, and/or available micro operations. The example PAC-MSR 185 signals to the example loader 145 the determination. In some examples, if excess micro operations are available (block 420: YES), the loader 145 loads or otherwise installs a pApp 155, 160 (block 430) into memory 120, the pApp 155, 160 being a fragment of microcode. In some examples, the loader 145 waits until excess micro operations are available (block 420: NO), before loading the pApp 155, 160. In such examples, the pApp 155, 160 may be executed without affecting the operating system 135 (i.e., execution of the pApp 155, 160 is hidden and/or does not block performance of the operating system 135).

Alternatively, the example pMSR trigger 175 may interrupt the operating system 135 when the loader 145 loads the pApp 155, 160. In such examples, the pMSR trigger 175 may also signal completion of the pApp 155, 160 to the operating system 135 to allow the same to continue. Thus, in some examples the pApps 155, 160 are blocking and in alternate examples, the pApps 155, 160 are non-blocking. In some examples, non-blocking pApps 155, 160 are used for longer processes (e.g., multiple cycles), while blocking pApps 155, 160 are used for short processes (e.g., a single cycle).

Once the example pApp 155, 160 is loaded into example memory 120 (block 430), the example CPU 115 executes the example pApp 155, 160 (block 440). In some examples, the loader 145 checks to see if the pApp 155, 160 has completed execution (block 450). If the example pApp 155, 160 has not finished execution (block 450: NO), the example loader 145 waits. If the example pApp 155, 160 has completed execution (block 450: YES), the example loader 145 unloads or otherwise removes the example pApp 155, 160 from example memory 120 (block 460). Thereafter, the example program 400 ceases.

Figure 5:
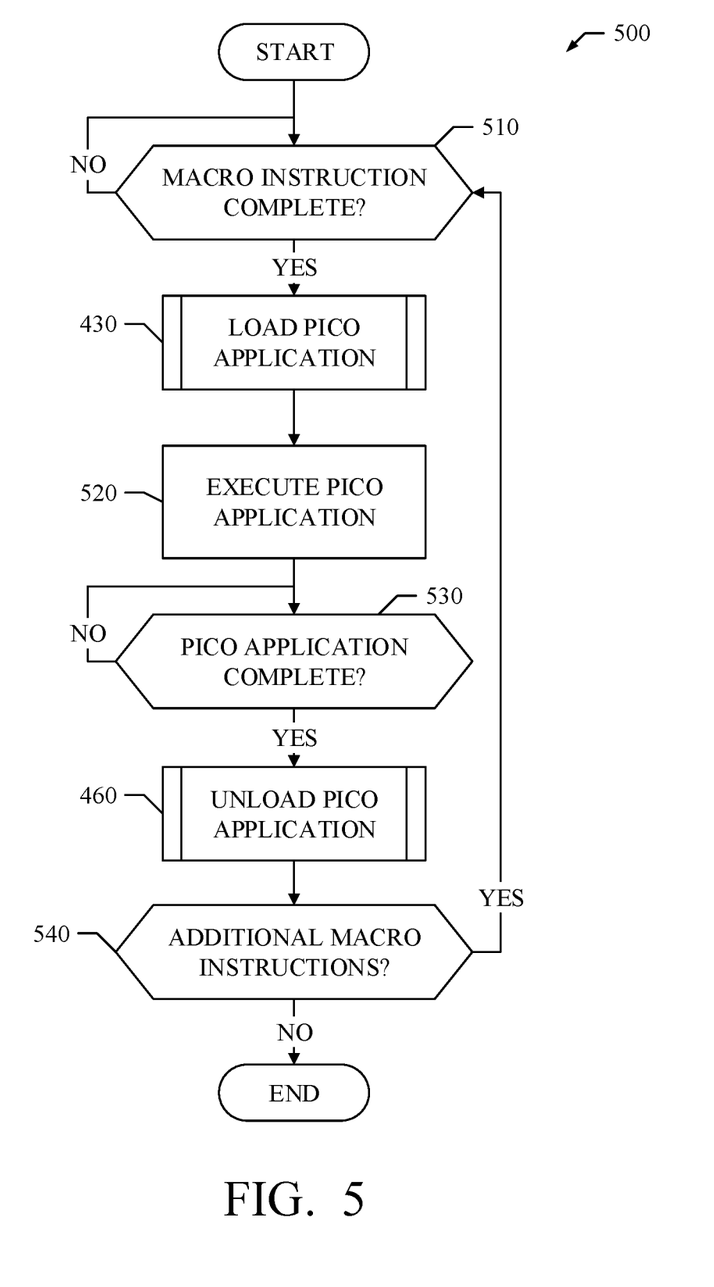
FIG. 5 illustrates example machine readable instructions that may be executed to introduce the small fragments of code illustrated in FIG. 2 using the example apparatus of FIG. 1.

FIG. 5 illustrates example machine readable instructions that may be executed to introduce the small fragments of code illustrated in FIG. 2 by the example apparatus 100 of FIG. 1. In the illustrated example, the pApps 155, 160 are loaded between macro instructions to take advantage of excess micro operations in the ISA. As in the example process 400, the example host application 140 requests a trusted isolated execution in an example process 500. The example pMSR trigger 175 identifies this request and generates a pMSI. In some examples, the pMSI signals the loader 145 to verify whether excess micro operations are available. In some examples, the PAC-MSR 185 determines a pApp 155, 160 is loadable based on, at least, size of the pApp 155, 160, available space in memory 120, and/or excess micro operations available between the first macro instruction 220 and the second macro instruction 240. The example PAC-MSR 185 signals to the example loader 145 the determination. In the illustrated example, the loader 145 acknowledges that the first macro instruction 220 (FIG. 2) has completed (block 510). In some examples, the first macro instruction 220 has a smaller size than the second macro instruction 240 (e.g., first macro instruction 220 is 16 bits while the second macro instruction is 32 bits). Due to the size variance, the example CPU 115 may refrain from executing the second macro instruction immediately thereafter. The example PAC-MSR 185 identifies such a size variance and determines that excess micro operations are available. Accordingly, the example loader 145 begins to load the example pApp 155, 160 (block 430). Once the example pApp 155, 160 is loaded into example memory 120, the example CPU 115 executes the example pApp 155, 160 (block 520). In some examples, the loader 145 checks to see if the pApp 155, 160 has completed execution (block 530). In some examples, the pApp 155, 160 writes to the host-MSR 130 to indicate completed execution. If the example pApp 155, 160 has been executed (block 530: YES), the example loader 145 unloads or otherwise removes the example pApp 155, 160 from example memory 120 (block 460). The example loader 145 checks if there are additional macro instructions (block 540). If there are additional macro instructions (block 540: YES), then control returns to block 510. Otherwise, the example process 500 ceases. Of course, this process may repeat.

Figure 6:
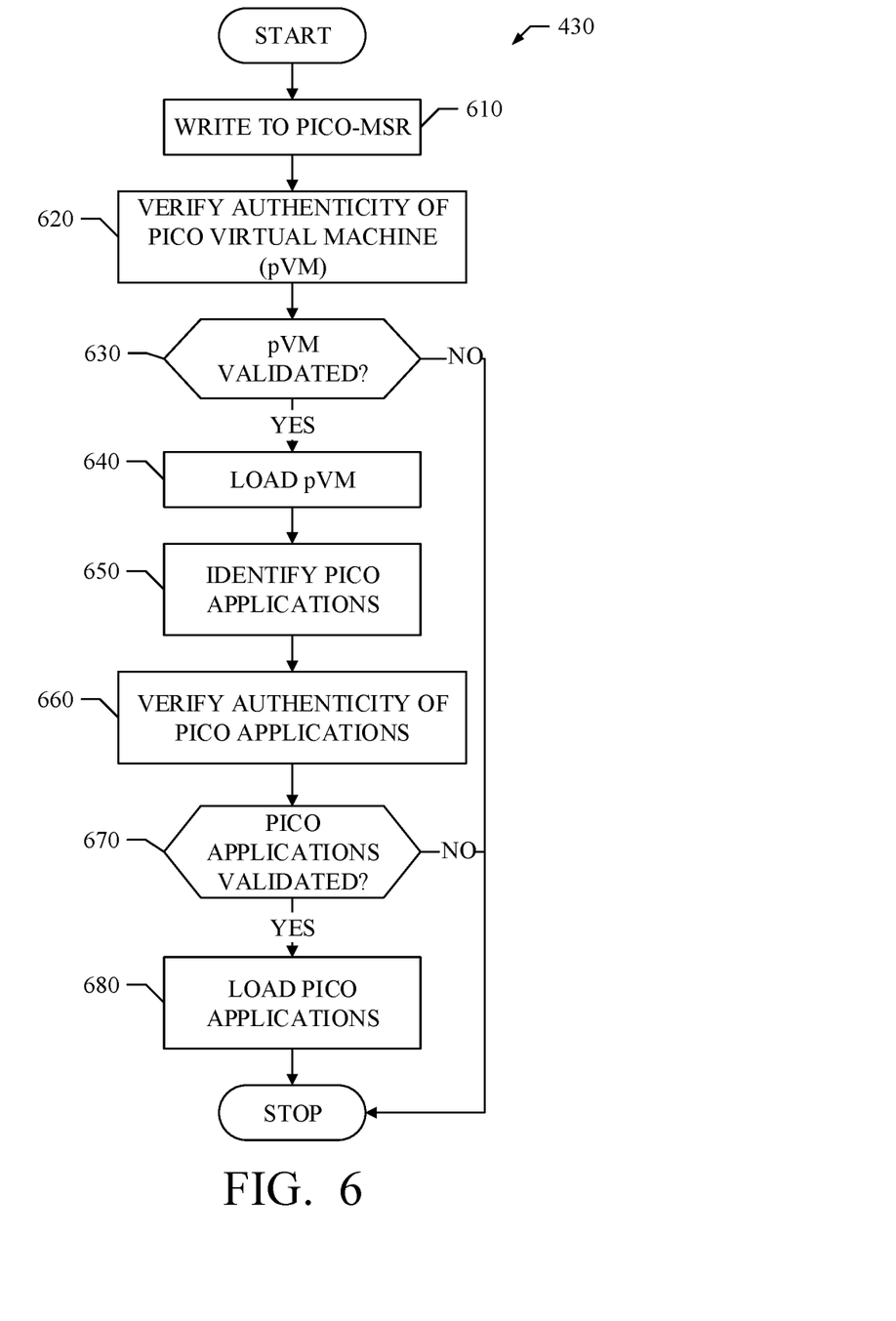
FIGS. 6-7 illustrates example machine readable instructions for implementing the example loader of FIG. 1.
Figure 7:
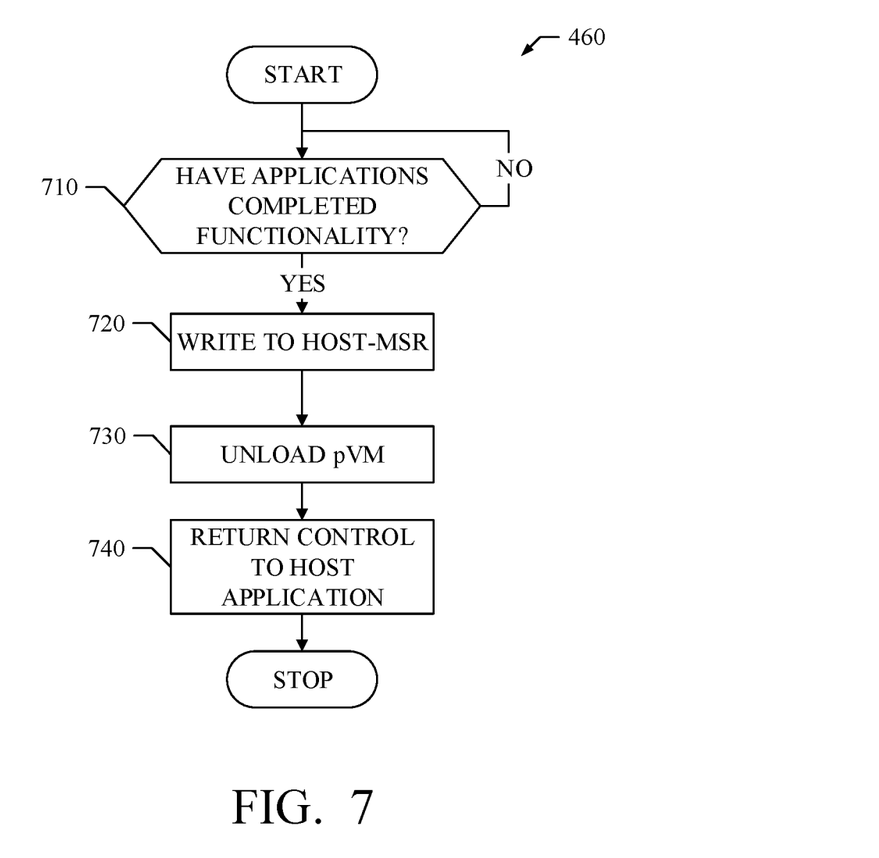

FIGS. 6-7 illustrates example machine readable instructions for implementing the example loader of FIG. 1. FIG. 6 illustrates example machine readable instructions to implement block 430 of FIGS. 4-5 by the example loader of FIG. 1

In some examples, when the host application 140 requires trusted computing, the host application 140 will request entry into the pVM 150. In such examples, the host application 140 will perform a write to the pico-MSR 125 (block 610). When the example host application 140 writes to the example pico-MSR 125, the example pMSR trigger 175 will generate a pMSI. The example loader 145 identifies the pMSI and removes control from the example host application 140. The example loader 145 begins to load the example pVM 150. In some examples, the loader 145 validates the pVM 150 prior to loading (block 620). In some examples, the authenticity of the pVM 150 and the pApps 155, 160 is validated by checking whether the pVM 150 and the pApps 155, 160 match the CPU 115, have valid headers, loader versions, and check sums, and/or pass an authenticity and/or signature pass.

If the example loader 145 determines that the example pVM 150 is invalid (i.e., fails one of the aforementioned checks) (block 630: NO), the example pVM 150 is not loaded. Otherwise, the example loader 145 loads the example pVM 150 into example memory 120 (block 640). Once the example loader 145 loads the example pVM 150, the example pVM 150 identifies example pApps 155, 160 to be loaded (block 650). In some examples, the pVM 150 determines which pApps 155, 160 to be loaded by identifying message signaled interrupt ("MSI") bits generated by the pMSR trigger 175 based on the request by the host application 140.

In some examples, the decoder 165 compares the bits of the MSI to the cryptography library 180. Upon determining which example pApp 155, 160 the MSI bits refer to, the example decoder 165 decodes the example pApp 155, 160 into micro operations to be executed by the example CPU 115. The example dispatcher 170 sends the decoded pApps 155, 160 to the example loader 145 for loading of the same. The example loader 145 validates (i.e., per the aforementioned validation checks) the selected example pApps 155, 160 and prepares the example pApps 155, 160 for execution by the example CPU 115 (block 660). If the example loader 145 determines that the example pApps 155, 160 are invalid (block 670: NO), the example pApps 155, 160 are not loaded. Otherwise, the example loader 145 loads the example pApps 155, 160 into example memory 120 (block 680).

FIG. 7 illustrates example machine readable instructions to implement block 460 of FIGS. 4-5 by the example loader of FIG. 1. In some examples, the loader 145 waits for the pApps 155, 160 to complete execution (block 710). Upon execution completion (block 710: YES), the example pApps 155, 160 perform a write to the example host-MSR 130 (block 720). The example pMSR trigger 175 will generate a second pMSI to instruct the example loader 145 to unload the example pApps 155, 160 and the example pVM 150 from example memory 120 (block 730). The example loader 145 then returns control back to the example host application 140 (block 740).

In this manner, isolated fragments of code are introduced to the example CPU 115 during an instruction cycle without interfering with the normal operations of the example operating system 135 or the example host application 140. In some examples, the pVM 150 and the loader 145 inter-splice pApps 155, 160 decoded into micro operations, effectively reusing micro architecture state. In some examples, the methods and apparatus disclosed herein utilize memory 120 that the operating system 135 and/or the CPU 115 use to cache macro instructions. Therefore, it will be apparent that the methods and apparatus disclosed herein, in some examples, inter-spliced small enough fragments of code to avoid disrupting the normal operations of the host device 105, while providing trusted isolated execution environments. In some examples, however, it may be necessary to interrupt the normal operations of the host device 105 to perform larger fragments of code.

Figure 8:
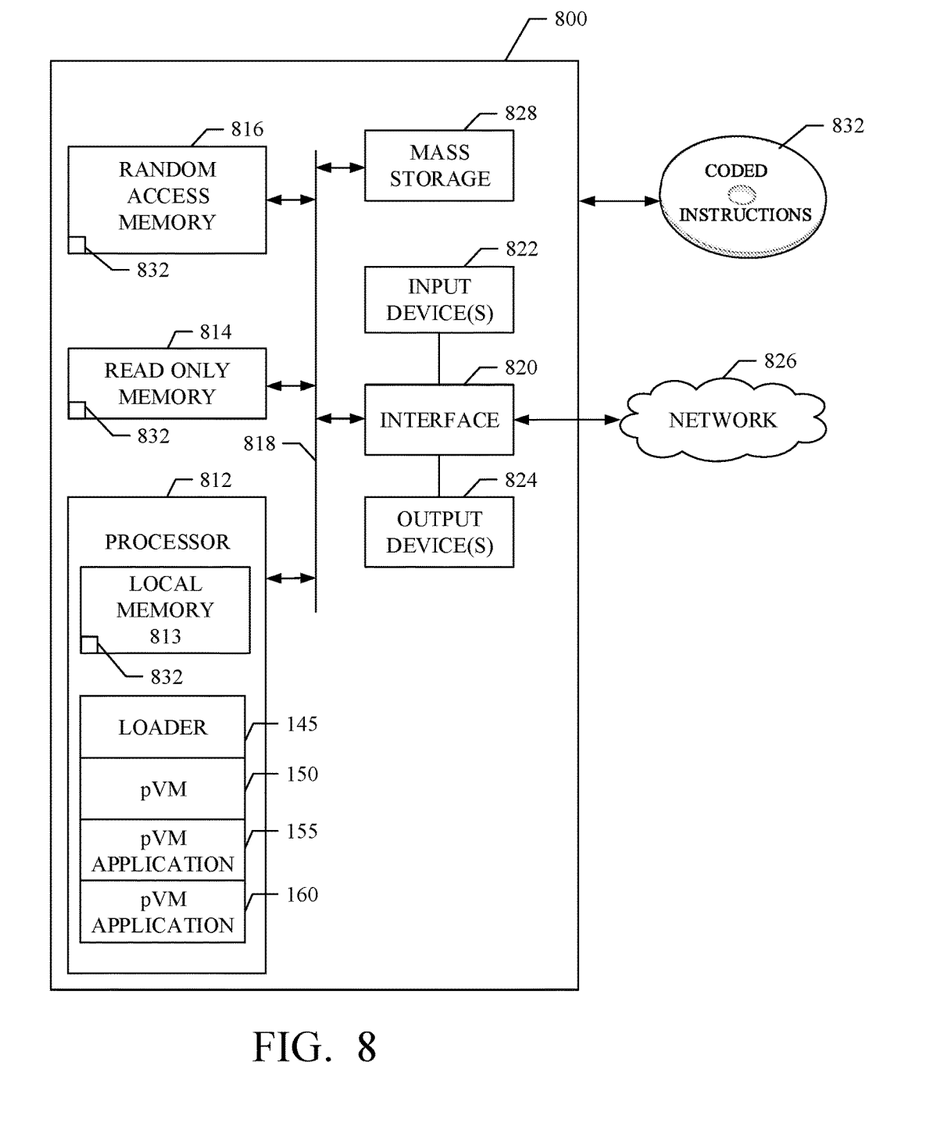
FIG. 8 illustrates an example processor platform to execute the instructions of FIGS. 4-7 to implement the apparatus of FIG. 1.

FIG. 8 is a block diagram of an example processor platform 800 capable of executing the instructions of FIGS. 4-7 to implement the apparatus of FIG. 1. The processor platform 800 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, wearable technology (e.g., a smart watch) or other IoT/IoE device, and/or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer.

The processor 812 of the illustrated example includes a local memory 813 (e.g., a cache). Additionally, the example loader 145, the example pVM 150, and the example pApps 155, 160 may be included within the processor 812.

The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a button, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

The coded instructions 832 of FIGS. 4-7 may be stored in the mass storage device 828, in the volatile memory 814, in the non-volatile memory 816, and/or on a removable tangible computer readable storage medium such as a CD or DVD.

From the foregoing, it will be appreciated that the above disclosed methods, apparatus, and articles of manufacture provide isolated execution environments where utilizing corresponding hardware is impractical due to size, cost, and/or other constraints. Furthermore, trusted computing may be implemented on IoT/IoE devices by leveraging excess micro operations and executing fragments of code for security critical situations. The example methods and apparatus manipulate the existing ISA within the CPU to achieve trusted computing without secondary dedicated processors. The above disclosed methods, apparatus and articles of manufacture provide additional performance to the existing computer architecture without diminishing current capacity.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following further examples include subject matter such as, for example, apparatus to provide isolated execution environments, tangible computer readable medium comprising instructions, that when executed, cause a machine to provide isolated execution environments, and methods to provide isolated execution environments.

Example 1 is an apparatus to provide isolated execution environments, which includes a trigger to identify a request from a host application. Example 1 also includes a loader to, in response to identifying the request from the host application, load a first microcode application into memory when excess micro operations exist in a host instruction set architecture, the first microcode application being a fragment of code. Example 1 further includes a processor to execute the first microcode application, wherein in response to completed execution of the first microcode application, the loader is to unload the first microcode application from memory.

Example 2 includes the subject matter of example 1, wherein the first microcode application is a security critical trusted execution operation.

Example 3 includes the subject matter of example 2, wherein the security critical trusted execution operation is scrub, seal, decode, wrap key, unwrap key, derive key, generate key, bind key, sign, record state, or audit.

Example 4 includes the subject matter of example 1, example 2, or example 3, wherein, to execute the first microcode application, the processor is to execute the first microcode application between variously sized macro-instructions, execute the first microcode application in parallel with a non-conflicting micro operation, execute the first microcode application during a macro-instruction having high latency, or execute the first microcode application with cached micro operations.

Example 5 includes the subject matter of any of examples 1-4, wherein the processor is to keep the first microcode application hidden from the operating system.

Example 6 includes the subject matter of any of examples 1-5, further including cache memory to store the first microcode application and a second microcode application, the loader to, in response to completed execution of the first microcode application, load the second microcode application into memory.

Example 7 includes the subject matter of any of examples 1-6, wherein the loader is to prevent additional code from being run until after the unloading of the first microcode application.

Example 8 includes the subject matter of any of examples 1-7, wherein in response to the host application performing a first write operation to a first machine status register, the loader is to determine that excess micro operations exist in the instruction set architecture. In example 8, the loader is to also to load a virtual machine into memory, wherein the virtual machine is to validate and load the first microcode application into memory.

Example 9 includes the subject matter of example 8, wherein, in response to the first write operation, the loader is to validate the virtual machine.

Example 10 includes the subject matter of claim 9, wherein, to validate the virtual machine, the loader is to match the virtual machine to a platform of the processor. In example 10, the loader is to also verify the virtual machine has a valid header, loader version, and check sum. Additionally, in example 10, the loader is to check an authenticity and a signature of the virtual machine.

Example 11 includes the subject matter of any of examples 1-8, wherein the loader is to unload the virtual machine and the first microcode application from memory in response to the first microcode application performing a second write operation to a second machine status register.

Example 12 includes the subject matter of example 11, wherein the loader is to, in response to the loading of the virtual machine and the first microcode application, remove control from a host device. In example 12, the loader is to return control to the host device in response to the unloading of the virtual machine and micro-application.

Example 13 is a tangible computer readable storage medium comprising instructions to provide isolated execution environments that, when executed, cause a machine to identify a request from a host application. Example 13 also includes instructions that, when executed, cause the machine to, in response to identifying the request from the host application, load a first microcode application into memory when excess micro operations exist in the host instruction set architecture, the first microcode application being a fragment of code. Example 13 also includes instructions that, when executed, cause the machine to execute the first microcode application. Example 13 also includes instructions that, when executed, cause the machine to, in response to completion of the first microcode application, unload the first microcode application from memory.

Example 14 includes the subject matter of example 13, wherein the first microcode application is a security critical trusted execution operation.

Example 15 includes the subject matter of example 14, wherein the security critical trusted execution operation is at least one of scrub, seal, decode, wrap key, unwrap key, derive key, generate key, bind key, sign, record state, or audit.

Example 16 includes the subject matter of example 13, example 14, or example 15, wherein to execute the first microcode application, the instructions are to at least execute the first microcode application between variously sized macro-instructions, execute the first microcode application in parallel with a non-conflicting micro operation, execute the first microcode application during instruction latency, or execute the first microcode application with cached micro operations.

Example 17 includes the subject matter of any of examples 13-16, further including instructions that, when executed, cause the machine to hide execution of the first microcode application from the operating system.

Example 18 includes the subject matter of any of examples 13-17, further including instructions that, when executed, cause the machine to cache the first microcode application and a second microcode application. Example 18 further including instructions to, in response to completion of the first microcode application, load the second microcode application into memory.

Example 19 includes the subject matter of any of examples 13-18, further including instructions that, when executed, cause the machine to prevent additional code from being run until after the first microcode application is unloaded.

Example 20 includes the subject matter of any of examples 13-19, further including instructions that, when executed, cause the machine to perform a first write operation to a first machine status register based on the request from the host application. Example 20 also includes instructions to, in response to determining excess micro operations exist in the instruction set architecture, load a virtual machine into memory. Example 20 further includes instructions to validate and load, via the virtual machine, the first microcode application into memory.

Example 21 includes the subject matter of example 20, further including instructions that, when executed, cause the machine to, in response to the first write operation, validate the virtual machine.

Example 22 includes the subject matter of example 21, further including instructions that, when executed, cause the machine to match the virtual machine to a platform of a central processing unit. Example 22 also includes instructions to verify the virtual machine has a valid header, loader version, and check sum. Example 22 further includes instructions to check an authenticity and a signature of the virtual machine.

Example 23 includes the subject matter of any of examples 13-20, further including instructions that, when executed, cause the machine to perform a second write operation to a second machine status register. Example 23 also includes instructions to, in response to the second write operation, unload the virtual machine and the first microcode application from memory.

Example 24 includes the subject matter of example 23, further including instructions that, when executed, cause the machine to, in response to the loading of the virtual machine and the first microcode application, remove control from a host device. Example 24 also includes instructions to, in response to the unloading of the virtual machine and the first micro-application, return control to the host device.

Example 25 is a method to provide isolated execution environments, including identifying a request from a host application. Example 25 also includes, in response to identifying the request from the host application, loading a first microcode application into memory when excess micro operations exist in the host instruction set architecture, the first microcode application being a fragment of code. Example 25 further includes executing the first microcode application. Example 25 additionally includes in response to completion of the first microcode application, unloading the first microcode application from memory.

Example 26 includes the subject matter of example 25, wherein the first microcode application is a security critical trusted execution operation.

Example 27 includes the subject matter of example 26, wherein the security critical trusted execution operation is at least one of scrub, seal, decode, wrap key, unwrap key, derive key, generate key, bind key, sign, record state, or audit.

Example 28 includes the subject matter of example 25, example 26, or example 27, wherein the executing of the first microcode application includes at least one of executing the first microcode application between variously sized macro-instructions, executing the first microcode application in parallel with a non-conflicting micro operation, executing the first microcode application during instruction latency, or executing the first microcode application with cached micro operations.

Example 29 includes the subject matter of any of examples 25-28, wherein at least one of the loading, executing, or unloading of the first microcode application is hidden from the operating system.

Example 30 includes the subject matter of any of examples 25-29, further including caching the first microcode application and a second microcode application. Example 30 also includes, in response to completion of the first microcode application, loading the second microcode application into memory.

Example 31 includes the subject matter of any of examples 25-30, wherein additional code is prevented from being run until after the unloading of the first microcode application.

Example 32 includes the subject matter of any of examples 25-31, wherein the loading of the first microcode application includes performing a first write operation to a first machine status register based on the request from the host application. Example 32 also includes, in response to determining excess micro operations exist in the instruction set architecture, loading a virtual machine into memory, the virtual machine to validate and load the first microcode application into memory.

Example 33 includes the subject matter of example 32, further including, in response to the first write operation, validating the virtual machine.

Example 34 includes the subject matter of example 33, wherein the validating of the virtual machine includes matching the virtual machine to a platform of a central processing unit, verifying the virtual machine has a valid header, loader version, and check sum, and checking an authenticity and a signature of the virtual machine.

Example 35 includes the subject matter of any of examples 25-32, wherein the unloading of the first microcode application includes performing a second write operation to a second machine status register, and in response to the second write operation, unloading the virtual machine and the first microcode application from memory.

Example 36 includes the subject matter of example 35, further including in response to the loading of the virtual machine and the first microcode application, removing control from a host device. Example 36 further includes, in response to the unloading of the virtual machine and micro-application, returning control to the host device.

Example 37 is an apparatus to provide isolated execution environments, including means for obtaining a request from a host application. Example 37 also includes means for, in response to identifying the request from the host application, installing a first microcode application into memory when excess micro operations exist in the host instruction set architecture, the first microcode application being a fragment of code. Example 37 also includes means for running the first microcode application. Example 37 further includes means for, in response to completion of the first microcode application, removing the first microcode application from memory.

Example 38 includes the subject matter of example 37, wherein the first microcode application is a security critical trusted execution operation.

Example 39 includes the subject matter of example 38, wherein the security critical trusted execution operation is at least one of scrub, seal, decode, wrap key, unwrap key, derive key, generate key, bind key, sign, record state, or audit.

Example 40 includes the subject matter of example 37, example 38, or example 39, wherein the means for running the first microcode application includes at least one of means for executing the first microcode application between variously sized macro-instructions, means for executing the first microcode application in parallel with a non-conflicting micro operation, means for executing the first microcode application during instruction latency, or means for executing the first microcode application with cached micro operations.

Example 41 includes the subject matter of any of examples 37-40, wherein at least one of the installing, running, or removing of the first microcode application is to be hidden from the operating system.

Example 42 includes the subject matter of any of examples 37-41, further including means for caching the first microcode application and a second microcode application. Example 42 further includes means for, in response to completion of the first microcode application, installing the second microcode application into memory.

Example 43 includes the subject matter of any of examples 37-42, further including means for preventing additional code from being run until after the first microcode application is unloaded.

Example 44 includes the subject matter of any of examples 37-43, further including means for writing to a first machine status register based on the request from the host application. Example 44 also includes means for identifying that excess micro operations exist in the instruction set architecture. Example 44 further includes means for installing a virtual machine into memory, the virtual machine is to validate and install the first microcode application into memory.

Example 45 includes the subject matter of example 44, further including means for, in response to the writing to a first machine status register, validating the virtual machine.

Example 46 includes the subject matter of example 45, further including means for matching the virtual machine to a platform of a central processing unit. Example 46 also includes means for verifying the virtual machine has a valid header, loader version, and check sum. Example 46 further includes means for checking an authenticity and a signature of the virtual machine.

Example 47 includes the subject matter of any of examples 37-44, further including means for writing to a second machine status register. Example 47 further includes means for, in response to the writing to a second machine status register, removing the virtual machine and the first microcode application from memory.

Example 48 includes the subject matter of example 47, further including means for, in response to the installing of the virtual machine and the first microcode application, removing control from a host device. Example 48 also includes means for, in response to the unloading of the virtual machine and micro-application, returning control to the host device.

Example 49 includes the subject matter of any of examples 1-8, wherein the request from the host application is responsive to micro architectural event triggers including thermal events (e.g., overheating), resets, overclocking, tampering, system state transition, etc.

Example 50 includes the subject matter of any of examples 13-20, wherein the request from the host application is responsive to micro architectural event triggers including thermal events (e.g., overheating), resets, overclocking, tampering, system state transition, etc.

Example 51 includes the subject matter of any of examples 25-32, wherein the request from the host application is responsive to micro architectural event triggers including thermal events (e.g., overheating), resets, overclocking, tampering, system state transition, etc.

Example 52 includes the subject matter of any of examples 37-44, wherein the request from the host application is responsive to micro architectural event triggers including thermal events (e.g., overheating), resets, overclocking, tampering, system state transition, etc.

What is claimed is:

1. An apparatus to provide an isolated execution environment, comprising:
a machine status register to:
determine whether excess micro operation instances occur within an instruction cycle to execute a pico-application in response to a request for computing provided by a host application, the pico-application being a fragment of microcode, the microcode comprising a plurality of micro operations; and
determine whether space is available in a memory to load the pico-application;
a loader executed by a computer processor to:
load a virtual machine and the pico-application into the memory in response to the excess micro operations and the space in the memory being available, the virtual machine validating the pico-application and loading the pico-application into the memory; and
the computer processor to execute the pico-application via the excess micro operations.

2. The apparatus of claim 1, wherein the computer processor is to execute the pico-application between macro instructions, the macro instructions being split into the plurality of micro operations.

3. The apparatus of claim 2, wherein the loader is to load the pico-application into the memory and unload the pico-application from the memory between the macro instructions.

4. The apparatus of claim 2, wherein the machine status register is to determine that the excess micro operations are available based on a size variance between the macro instructions.

5. The apparatus of claim 1, wherein the computer processor is to execute the pico-application during a macro instruction, the macro instruction being split into the plurality of micro operations.

6. The apparatus of claim 5, wherein the computer processor is to execute the pico-application in parallel with a non-conflicting micro operation of the macro instruction.

7. The apparatus of claim 5, wherein the macro instruction has a high latency.

8. The apparatus of claim 1, wherein the computer processor is to execute the pico-application with cached micro operations.

9. A method comprising:
determining whether excess micro operation instances occur within an instruction cycle to execute a pico-application in response to a request for computing provided by a host application, the pico-application being a fragment of microcode, the microcode comprising a plurality of micro operations;

determining whether space is available in a memory to load the pico-application;

loading a virtual machine and the pico-application into the memory in response to the excess micro operations and the space in the memory being available, the virtual machine validating the pico-application and loading the pico-application into the memory; and executing the pico-application via the excess micro operations.

10. The method of claim 9, further including executing the pico-application between macro instructions, the macro instructions being split into the plurality of micro operations.

11. The method of claim 10, further including determining that the excess micro operations are available based on a size variance between the macro instructions.

12. The method of claim 9, further including executing the pico-application during a macro instruction, the macro instruction being split into the plurality of micro operations.

13. The method of claim 12, further including executing the pico-application in parallel with a non-conflicting one of the plurality of micro operations.

14. The method of claim 9, further including executing the pico-application with cached micro operations.

15. A tangible computer readable storage medium comprising instructions which, when executed, cause a processor to at least:

determine whether excess micro operation instances occur within an instruction cycle to execute a pico-application in response to a request for computing provided by a host application, the pico-application being a fragment of microcode, the microcode comprising a plurality of micro operations;

determine whether space is available in a memory to load the pico-application;

load a virtual machine and the pico-application into the memory in response to the excess micro operations and the space in the memory being available, the virtual machine validating the pico-application and loading the pico-application into the memory; and execute the pico-application via the excess micro operations.

16. The tangible computer readable storage medium of claim 15, wherein the instructions cause the processor to execute the pico-application between macro instructions, the macro instructions being split into the plurality of micro operations.

17. The tangible computer readable storage medium of claim 16, wherein the instructions cause the processor to load the pico-application into the memory and unload the pico-application from the memory between the macro instructions.

18. The tangible computer readable storage medium of claim 15, wherein the instructions cause the processor to execute the pico-application during a macro instruction, the macro instruction being split into the plurality of micro operations.

19. The tangible computer readable storage medium of claim 18, wherein the macro instruction has a high latency.

20. The tangible computer readable storage medium of claim 15, wherein the instructions cause the processor to execute the pico-application with cached micro operations.

* * * * *